United States Patent [19]

El-Saie

[11] Patent Number: 4,775,487

[45] Date of Patent: Oct. 4, 1988

[54] ROTATING CONTINUOUS SEPARATION SYSTEM

[75] Inventor: Ahmed A. El-Saie, Venetia, Pa.

[73] Assignee: Consolidation Coal Company, Pittsburgh, Pa.

[21] Appl. No.: 944,724

[22] Filed: Dec. 22, 1986

[51] Int. Cl.[4] .................... B01D 29/02; B01D 35/14; B01D 37/00

[52] U.S. Cl. .................... 210/747; 210/780; 210/791; 210/323.2; 210/330

[58] Field of Search ............ 210/780, 791, 203, 241, 210/323.2, 327, 330, 332, 340, 341, 432, 472, 747, 784; 100/127, 223, 116

[56] References Cited

U.S. PATENT DOCUMENTS

| | | | |
|---|---|---|---|
| 2,904,835 | 9/1959 | Thomas | 100/116 |
| 3,999,895 | 12/1976 | Boyle | 417/342 |
| 4,230,733 | 10/1980 | Tilby | 100/116 |
| 4,389,928 | 6/1983 | Burgin | 100/116 |
| 4,404,101 | 9/1983 | Koch et al. | 210/323.2 |

Primary Examiner—Richard V. Fisher
Assistant Examiner—Linda S. Evans
Attorney, Agent, or Firm—Alan N. McCartney; Cortlan R. Schupbach

[57] ABSTRACT

A continuous separation apparatus having a plurality of separation chambers in a continuously rotating block between fixed end plates. The axis of the chambers, preferably cylinders, is parallel to the axis of rotation of the block, wherein the end plates are provided with stationary inlet and discharge ports which overlap openings in the cylinders as the cylinders rotate so that cylinders are constantly being filled by forcing a free-floating piston to one end of the cylinder, cylinder contents are separated by hydraulically forcing the piston toward the fill end of the cylinder where the liquid is removed through screen means at the fill end of the cylinder and solid contents evacuated through an end plate port. The cylinder block continues rotation to permit a constant flow into the apparatus, a continuous removal of separated fluid and a constant separated solids flow from the apparatus.

3 Claims, 4 Drawing Sheets

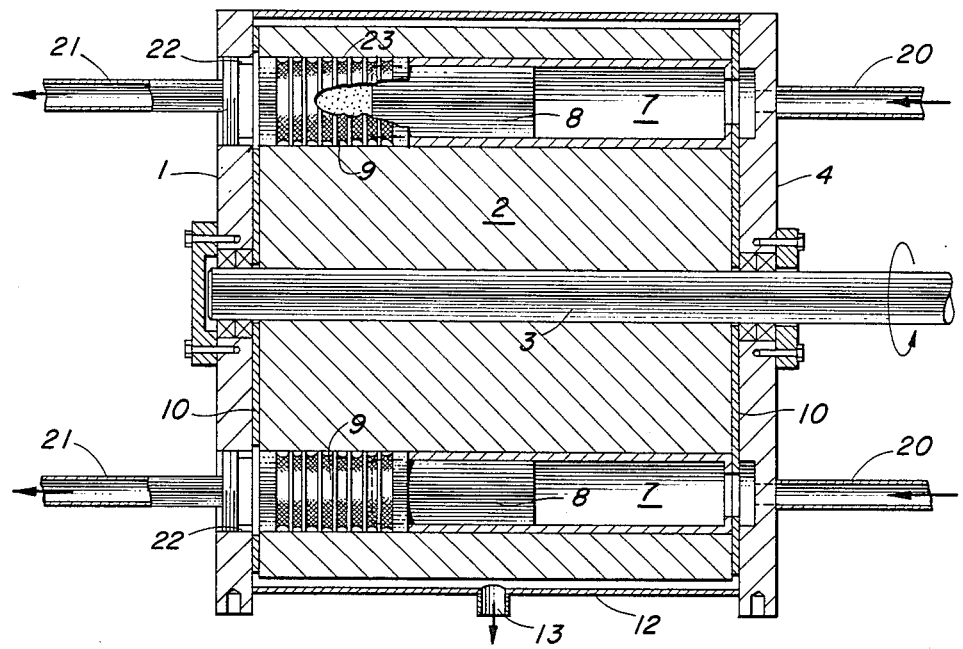
F I G. 3
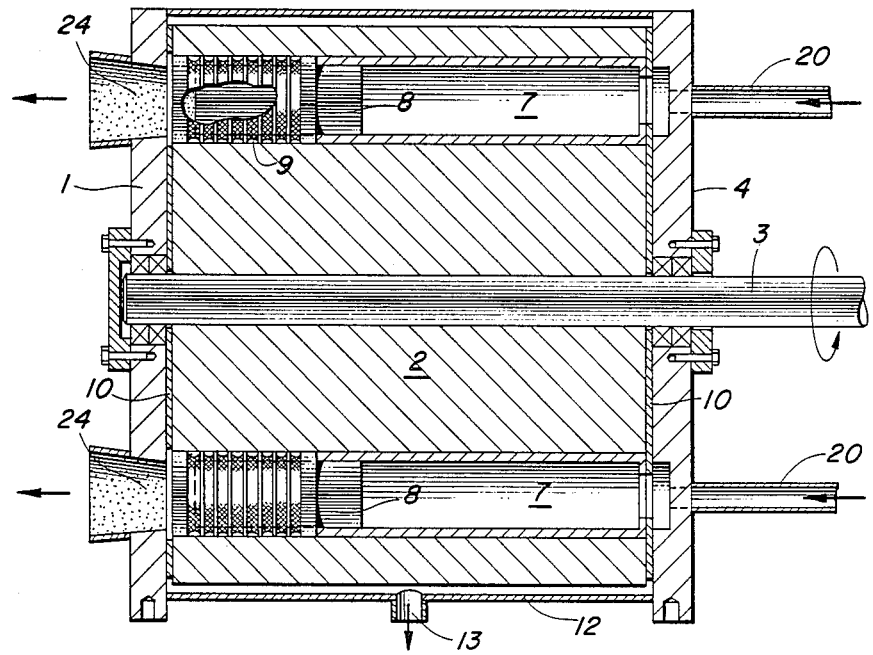
F I G. 4

ROTATING CONTINUOUS SEPARATION SYSTEM

This invention relates to a continuous separation apparatus. More particularly, this invention relates to a continuously rotating barrel having a plurality of cylindrical openings, allowing continuous separation of solids, liquids, and optionally gases.

Representative but non-exhaustive examples of the art in this area includes U.S. Pat. No. 3,999,895 which comprises a rotating barrel pump. However, the barrel pump is not known for separating solids. German Offenlegungsschrift No. 25 48 971 shows an apparatus fitted with a rotating hydraulic piston inside a rotating perforated drum to strain slurries or other mixtures of liquids and solids including a centrifuge containing a rotating hydraulic or pneumatic pusher plate which compresses the slurry forcing the liquid through perforations in the centrifuge drum. U.S. Pat. No. 3,375,932 discloses a continuous filtration apparatus wherein the revolving perforated drum is covered by a filter cloth.

U.S. Pat. 2,904,835 shows a sludge deliquifying compacting press using chamber ram units and serial indexed positioning of the individual member of such units to separate work positions or stations to compact liquified sludge. U.S. Pat. No. 4,230,733 deals with methods and apparatus for extracting juices from plant materials and indexes to work stations. Each work station includes a constantly changing cell arrangement to carry charges of plant material, together with an indexing mechanism which rotates the head in line with plungers to extract juice from plant cells. U.S. Pat. 4,389,928 shows an apparatus for collecting liquid extract and a pressed dry by-product from a mash of fibrous material using a ram and movable plugs and pistons. In its most specific form the apparatus relates to separating slurries or sludges and for simultaneously compressing the solids into easily handled cohesive forms.

Most common methods of separating liquids and solids are unfortunately not effective because of high residence time requirements, space requirements, power requirements, and the like. Filtration and/or sedimentation is not effective or applicable in situations where high residence time and space requirements do not permit the most common types of apparatus. Examples of such situations includes offshore oil platforms or underground mining situations wherein separation of solids from liquids and occasionally gas/liquid/solid mixtures is encountered.

It would therefore be of great benefit to provide a method for separating solids from liquids and optionally providing separation of gases from solids and liquids in a continuous, safe and efficient manner which does not occupy excess space.

It is therefore an object of the present invention to provide a novel method and apparatus for separating solids and gases from liquids. Other objects will become apparent to those skilled in this art as the description proceeds.

I have now devised an apparatus useful for separating solids and gases from liquids. The apparatus can be used, for example, in drilling coal seams which have a high gas pressure and which are drilled utilizing water-powered drilling devices. In general, the apparatus comprises an apparatus for separating solids from mixture with water or water and gas comprising (1) a machine frame and a continuously rotating drum rotatably mounted on said machine frame, said drum having a plurality of separation chambers radially arranged with respect to the axis of the drum and opening out of said drum wherein each chamber contains a movable piston and a circumferential screen at one end thereof and where each separating chamber passes through sequential filling, compression and evacuation stages during each cycle of rotation;

(2) first and second end plates nonrotatably arranged axially to said revolving drum said end plates having apertures therein wherein each of said separation chambers is sequentially positioned to (a) a fill position wherein an aperture in said second end plate allows a liquid/solid or gaseous/liquid/solid mixture into said separation chamber, forcing the movable piston toward said first end plate and allowing power liquid to drain through openings in said first end plate, and wherein the drum rotates to (b) a compression position wherein said first end plate allows high pressure power liquid to enter said separation chamber and force the movable piston toward said second end plate, such that liquid or liquid and gas in the slurry is forced through said circumferential screen and exits said second end plate through liquid removal means, and thereafter the rotating drum moves to (c) an evacuation position, wherein the high pressure power liquid fully extends the movable piston toward said second end plate and forces compressed solids from the separation chamber when the separation chamber aligns with an opening in said second plate; and (3) repeating the steps (a), (b), and (c) continuously, wherein each of the plurality of separation chambers continuously fills, separates and evacuates to separate solids from admixture with water or water and gas.

Because of its compact nature, the present invention is easily used in undeground mining situations where space is at a premium. In addition, the revolving barrel can be powered by a hydraulic motor, such that electricity is not necessary to the operation of the present invention. In a preferred use, the present invention is utilized in drilling coal seams, especially those having a high gas pressure.

Concisely stated, the system consists of a rotating barrel having various separation chambers each chamber having a screen and a piston. As the barrel rotates around its axis between two fixed plates, the front plate aligns with fill holes in the first stage while second stage separation chambers are in the compression/liquid separation stage and the third stage separation chambers are being evacuated of solids. As the barrel continuously rotates, these holes or separation chambers exchange places and functions relative to the end plates.

In a preferred embodiment, while in the filling position, the entering solid/liquid slurry will push the movable piston toward the first endplate. During filling, the power liquid which forces the movable piston toward the second end plate during separation will be discharged to a recovery reservoir. As the barrel continues rotation, the separation stage begins, wherein high pressure power liquid is supplied from a high pressure pump through the endplate and pushes the piston forward to separate liquid from the solids through the separation screen and to a liquid collection tank and gas collection.

Thus, the piston is pushed from the separation side during filling, and from the power side during separation and evacuation. The solids remain under pressure in the separation chambers as the barrel rotates into the evacuation position where the piston fully extends and pushes the solids outside the barrel through the solids endplate. These stages are repeated continually as the barrel continuously rotates. The barrel can be rotated by any means such as a hydraulic or electric motor. The barrel will preferably rotate between two layers of gaskets to seal the different openings and reduce the friction of the rotating barrel on the endplates. Optionally, a cover over the rotating barrel will provide a safety element for the high pressure liquid line, such as a water line, and will allow collection and discharge of any water seepage to the water collection tank.

The invention is more concretely described with reference to the drawings, generally described with reference to water as a fluid.

BRIEF DESCRIPTION OF THE DRAWINGS

FIG. 3 is section 3—3 separation position.

FIG. 4 is section 4—4 solids removal position.

DETAILED DESCRIPTION OF THE DRAWINGS

The instant invention is more concretely described with reference to the detailed description of the drawings provided below. The drawings are described in reference to the preferred embodiment of separating coal/water mixtures. Gas can be present in the slurry.

Figure 1:
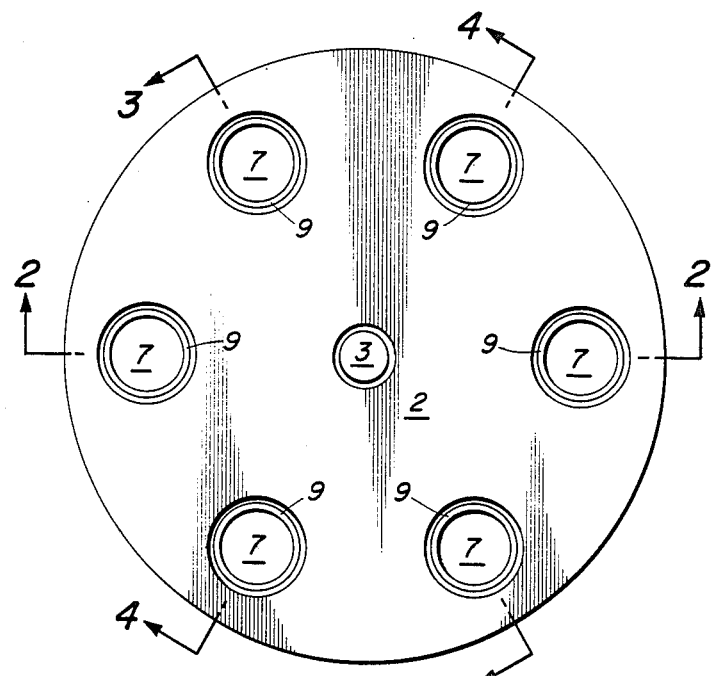
FIG. 1 is an end view of the continuously rotating separation barrel of the present invention showing the section lines for the figures that follow.

FIG. 1 is an end view of the continuously rotating separator barrel showing the section lines for the figures that follow. The shaft about which the barrel revolves is shown, as is an end view of the filter means used for separating solids from liquids.

Figure 2:
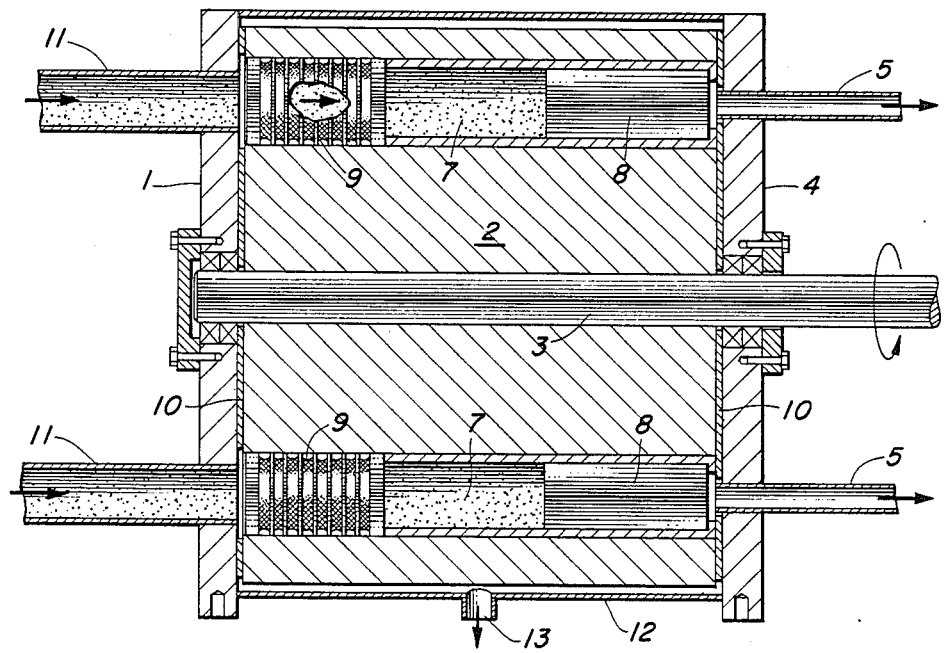
FIG. 2, a section 2—2 filling position with optional seepage recovery pan shown.

FIG. 2 is section 2—2 from FIG. 1, showing the filling position with an optional seepage recovery pan. In the figure, solids endplate 1 is on one side of continuously revolving separator barrel 2 which revolves about an axis 3. Power water endplate 4 has power water exit means 5. Each separation chamber 7 contains a freely movable piston 8 and a screen 9 for separating liquids from solids. In addition, preferred gasket means 10 is used to seal the revolving separator barrel or drum 2 to the nonrevolving, fixed end plates 1 and 4. Solid/water slurry is injected into the separation chambers through filling lines 11 forcing power fluid from the separation chambers through lines 5. An optional cover 12 and drain 13 is provided for fluid which seeps between the fixed end plates and the revolving barrel.

FIG. 3 is a cross section of 3—3 of the revolving barrel for the separation apparatus showing the separation position. All numerals have the same meaning as in FIGS. 1 and 2 except that high pressure fluid is injected through line 20 into the separation chambers 7 forcing movable piston 8 toward the solids end endplate 1, forcing water from the water/solids slurry through screens 9 into annulus space 23 and forcing water through aperatures in the endplate 22 and exit through line 21.

FIG. 4 is a section of FIG. 1 along lines 4—4 showing solids removal or evacuation using the present invention. In FIG. 4 the numbers previously disclosed have the same meanings. FIG. 4 shows in addition the exit of solids through aperture 24 in endplate 1.

Figure 5:
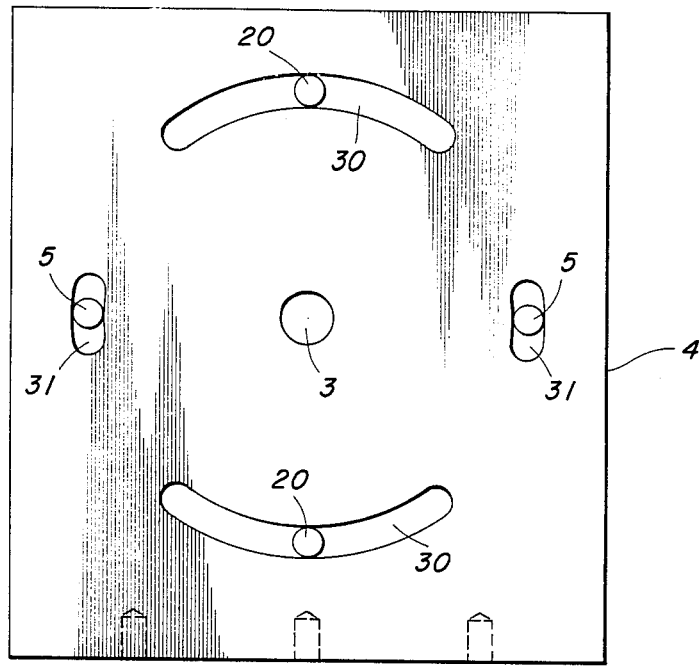
FIG. 5 is a view of the water endplate showing the high pressure water channels and relief channels for water drainage during fill from the barrel contact side.

FIG. 5 shows the liquid endplate 4 through which driving or power liquid is inserted and removed. The endplate is in general designated for and has therein fixed water insertion lines 20 and drain lines 5. Aperture 20 is connected by a channel 30 such that the separation chambers are effectively coupled to the aperture throughout a degree of rotation in order to enable both compression and evacuation to occur during the injection of high pressure liquid. Apertures 5 are coupled through a narrower degree of arc 31 and are used during the slurry fill cycle, at which time the driving or power liquid is expelled through end plate 4 by the force of the incoming solids/liquid slurry. A bearing aperture for rotatable shaft 3 is shown.

Figure 6:
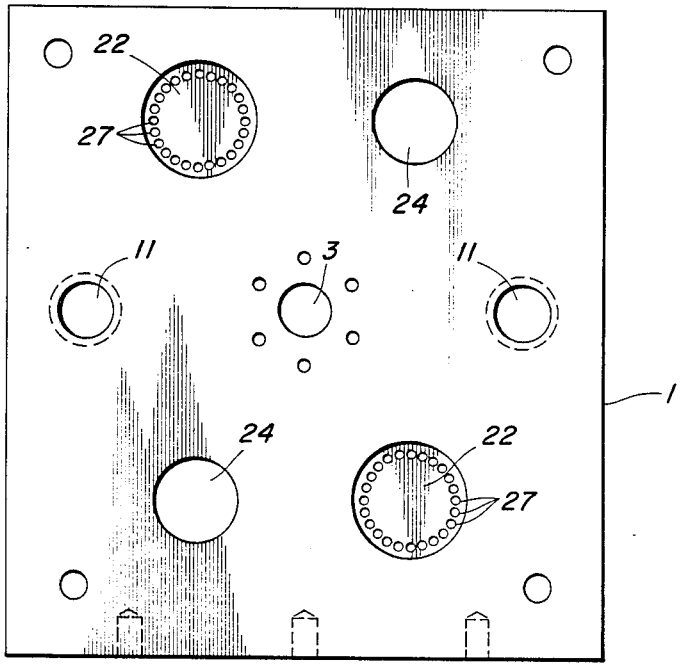
FIG. 6 is a view of the slurry solids endplate showing the slurry fill 11; separation 27; and evacuation 24 ports.

FIG. 6 is a solids end plate 1 showing an aperture for shaft 3, openings 24 for solids removal, opening 11 fill lines, and compression stage 23, wherein liquid is expelled through smaller apertures 27 in the cap plates 22.

Figure 7:
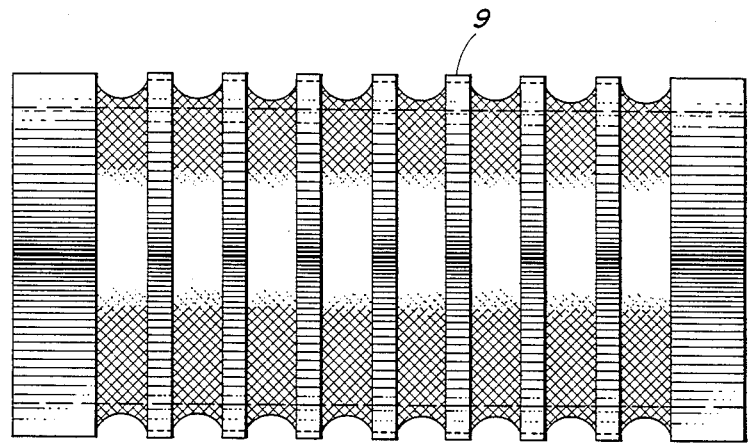
FIG. 7 is a side view of a filter assembly present in each separation chamber.

FIG. 7 is a side view of a preferred filter element for insertion into separation chamber 7. This filter element 9 is a V-wire or woven screen having additional support ribs and allowing the passage therethrough of liquid and gas while retaining the compressed solids. The filter element then allows the piston to pass entirely through the filter element, clearing all compressed solids from the separation chamber. The apparatus of the present invention has been described in terms of water or liquid/solid slurries in the use of a driving or power liquid in general terms. The apparatus is preferably used in the separation of water/solid slurries, utilizing water as the driving fluid. Water is innochuous, generally available and can also be used to power motors to turn the continuously revolving apparatus of the present invention.

In the event that gas is entrapped in the water/solid slurries of the present invention, gas can exit with the drain water as described and can be separated easily from liquids by simply venting from a pressure tank into a collection receptacle. During the separation stage, gas exits the container along with the separated liquid and no additional apparatus is needed for the separation of gas.

In particular, the present invention is admirably suited to the separation of coal/water/gas slurries such as encountered when drilling underground and utilizing high pressure water to drive drill motors and to flush cuttings from bore holes. The water recovered from the borehole can be recycled and reused after minimum filtration.

The filter elements described are preferably V-wire filter elements which are substantially non-clogging under the conditions of the present invention. However, for certain applications it may be desirable to use woven filter elements or filter elements which are simply fine holes drilled in a pipe or the like. It is only necessary that the movable piston be capable of passing through the center of the filter element and that the element remains centered in the separation chamber, allowing passage of liquid to the liquid collection apparatus.

Gasket material optionally and preferably described in the apparatus of the present invention can be tetrafluoroethylene, rubber, polyvinyl chloride, polyethylene or any other suitable friction reducing material. In some applications, such a friction reducing material will not be necessary as seepage will be acceptable during the use of water, as this water can simply be collected and reused.

The apparatus of the present invention has many savings advantages, both from space and economy of operation, because of water driving the circular drum as well as forming the driving fluid used in the separation chamber.

It will be realized by those skilled in this art that many substitutions as to materials, number of chambers, and the like can be made and all such are within the spirit and the scope of the present invention.

The present invention finds particular and preferred embodiment in underground coal mine and as such provides a safe, economical and space saving environment for the separation of solids from liquids and gases.

While certain embodiments and details have been shown for the purpose of illustrating the present invention, it will be apparent to those skilled in this art that various changes and modifications may be made herein without departing from the spirit or scope of the invention.

I claim:

1. A method of separating coal from a mixture with water or water and gas in a rotary drum having circumferentially spaced separation chambers each containing a circumferential screen and a movable piston, the drum being mounted between first and second stationary end plates having apertures aligned with the separation chambers, including continuously repeating during cyclic rotation of the drum the steps of sequentially filling each separation chamber with the mixture through an aperture in the first and plate causing the piston to move toward the second end plate and exhaust fluid from the chamber, forcing liquid into the separation chamber through an aperture in the second end plate causing the piston to move toward the first end plate, and forcing the mixture into the screen to separate the coal from the mixture and exhaust the water or water and gas out an aperture in the first end plate, and forcing the piston through the screen to remove the coal from the chamber through an aperture in the first end plate.

2. Method as described in claim 1 carried out in an underground mine.

3. Method as described in claim 2 wherein the rotary drum is powered by a hydraulic motor.

* * * * *